United States Patent [19]
Meyer

[11] Patent Number: 5,304,937
[45] Date of Patent: Apr. 19, 1994

[54] CAPACITIVE POSITION SENSOR WITH AN ELECTRODE ARRAY CURSOR AND TOPOGRAPHICALLY FEATURED SCALE

[76] Inventor: Hans U. Meyer, 42, rue de Lausanne, 1110 Morges, Switzerland

[21] Appl. No.: 941,223

[22] Filed: Sep. 4, 1992

[30] Foreign Application Priority Data

Oct. 15, 1991 [CH] Switzerland ............... 03017/91

[51] Int. Cl.[5] ............... G01B 7/22; G08C 19/10
[52] U.S. Cl. ............... 324/686; 324/662; 324/688; 324/690
[58] Field of Search ............... 318/662; 324/660, 662, 324/665, 669, 686, 688, 690; 340/870.37

[56] References Cited

U.S. PATENT DOCUMENTS

| | | | |
|---|---|---|---|
| 4,449,179 | 5/1984 | Meyer | 324/725 |
| 4,543,526 | 9/1985 | Burckhardt et al. | 324/660 |
| 4,607,213 | 8/1986 | Neukermans et al. | 324/662 |
| 4,654,581 | 3/1987 | Neukermans et al. | 324/725 |
| 4,841,225 | 6/1989 | Meyer | 324/660 |
| 4,882,536 | 11/1989 | Meyer | 324/61 R |
| 4,893,071 | 1/1990 | Miller | 324/660 |
| 5,068,653 | 11/1991 | Klingler et al. | 340/870.37 |

FOREIGN PATENT DOCUMENTS

| | | |
|---|---|---|
| 0053091 | 6/1982 | European Pat. Off. . |
| 0344942 | 12/1989 | European Pat. Off. . |
| 2539561 | 3/1977 | Fed. Rep. of Germany . |
| 2180351 | 3/1987 | United Kingdom . |

OTHER PUBLICATIONS

"Position Decoder", *IBM Technical Disclosure Bulletin*, vol. 21, No. 1, Jun. 1978, by D. Dobson et al., pp. 242–243.

*Primary Examiner*—Michael J. Tokar
*Assistant Examiner*—Christopher Tobin
*Attorney, Agent, or Firm*—Young & Thompson

[57] ABSTRACT

A capacitive position sensor has a scale (10), having hollow or raised topographical features, and a cursor (20) having an electrode array comprising at least two transmitting electrodes (21a, 21b) and at least one receiving electrode (21c) separated by shielding electrodes (21g). The coupling capacitances (Cac, Cbc) between transmitting and receiving cursor (20) electrodes are modified as a function of the position (x) of the scale topographic feature (11) relative to the cursor, the evaluation of the variation of the signals picked up by the receiving electrode permitting a precise measurement of the relative displacement between scale and cursor.

22 Claims, 6 Drawing Sheets

CAPACITIVE POSITION SENSOR WITH AN ELECTRODE ARRAY CURSOR AND TOPOGRAPHICALLY FEATURED SCALE

FIELD OF THE INVENTION

The invention relates to a capacitive position sensor comprising a cursor and a scale separated from each other by a given gap and movable relatively to each other along at least one measuring path, said cursor comprising at least two transmitting electrodes and at least one receiving electrode and first means for generating electrical signals applied to said transmitting electrodes and second means for evaluating the signals received by said receiving electrodes, so as to determine the relative position of cursor and scale.

BACKGROUND OF THE INVENTION

Several embodiments of such capacitive position sensors are known. Some of them, mostly intended for two dimensional position locating systems, also called digitizers and used as computer peripherals, need as a scale a matrix of wires embedded in a board and excited by electrical signals, said signals being picked up by a receiving electrode in the cursor, which may be a stylus or pointing device, as disclosed in U.S. Pat. No. 3,342,935. Such digitizers, due mostly to the complexity of the matrix of wires, are too costly to compete in applications where a simpler pointing device, such as a mouse, will be sufficient.

Other embodiments of such capacitive position sensors, mainly intended for linear or angular measuring instruments, such as jaw calipers, micrometers, dial indicators, rotary encoders, use a scale with a linear array of floating electrodes, i.e. completely insulated electrically from their surroundings, facing a cursor having transmitting and receiving electrodes. A capacitive position sensor of this type is described in U.S. Pat. No. 3,961,318. These floating electrodes eliminate the need for electrical connections to the scale, but there are still drawbacks. The scale may not be homogeneous, as an insulating substrate is needed under the conducting electrodes. Coupling between adjacent floating electrodes, as well as humidity induced surface conductivity of the scale, degrade performance. Moreover, the floating electrodes extend across the measuring path, as they need to provide two clearly separated functions, i.e. coupling to the transmitting electrodes and retransmitting the received signal to the receiving electrodes. Said extension across the measuring path, needed to implement both functions, prevents the extension of such an embodiment to a second dimension.

SUMMARY OF THE INVENTION

An object of the invention is to avoid these disadvantages. To this end, the scale comprises at least one hollow or raised topographic feature, a means for detecting and evaluating the signals coupled from the cursor transmitting electrodes to the cursor receiving electrodes, said scale topographic feature being arranged so as to influence said coupled signals by modifying the capacitive coupling between said cursor electrodes when cursor and scale are moved relative to each other along the at least one measuring path.

The invention allows a sensor which is accurate, easy to manufacture, and of low cost. The invention allows a straightforward extension of two dimensional measurement.

According to the invention, the scale may comprise several raised or hollow topographic elements arrayed along at least one measurement path so as to form a periodic texture, the cursor comprising at least one array of electrodes extending along said path and means for switching said electrodes to one of at least two electrical signals following a space periodic pattern.

This allows for accurate and low cost scales of any size.

Also according to the invention, the scale may comprise at least one row of topographic elements exhibiting a periodic texture along at least one measuring path, the cursor comprising one row of electrodes arrayed along said path, and means for switching each electrode of said row either to one of said at least two electrical signals, or to one of the inputs of an amplifier, or to a ground potential, in order to get a signal distribution having a period equal to said texture or being a multiple of it, said switching means also allowing the displacement of said signal distribution along said row of electrodes.

This arrangement makes very narrow scales possible, thus suitable for use in very limited spaces. The cursor can also be made very small.

Still according to the invention, the cursor may comprise two identical rows of transmitting electrodes aligned along one measuring path, along with receiving electrodes laid out parallelly to each such row of transmitting electrodes, and means for switching arranged for generating similar a.c. signal distributions, but of opposite polarity, on each such row. Said signal distributions can be displaced along the measuring path by said switch means. The receiving electrodes are connected to the inputs of a differential amplifier.

Such a capacitive sensor exhibits simple switching means and makes it easy to shield said receiving electrodes, along with said second means for detecting and evaluating the signals on them, from unwanted couplings. This results in a much better ratio between the measuring signals and the unwanted couplings on the cursor electrodes and associated circuitry.

Further according to the invention, the scale may comprise raised or hollow topographic features resulting in a two dimensional texture which is periodic along two perpendicular measuring paths.

Such scales are easy to manufacture and allow precise position detection over two dimensions.

BRIEF DESCRIPTION OF THE DRAWINGS

Other advantages are set forth in the claims and in the following description, by way of example only, of some embodiments of the invention with reference to the accompanying drawings, wherein:

FIG. 8d shows a lateral and cutaway view of a linear and/or circumferential scale made of a micrometer screw;

DETAILED DESCRIPTION OF THE INVENTION

Figure 1:
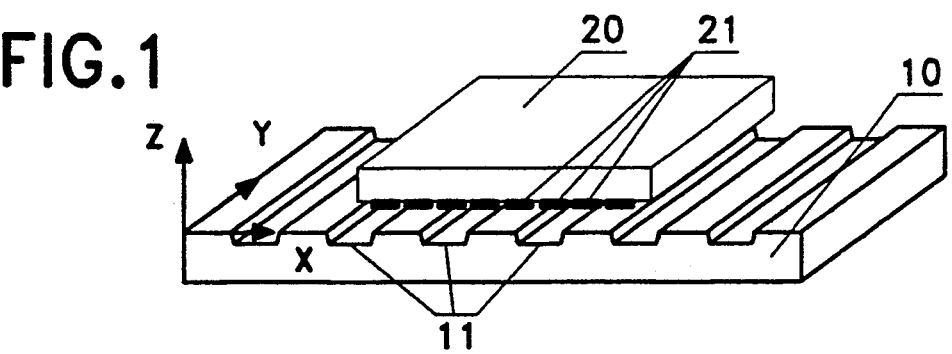
FIG. 1 illustrates a first embodiment of the invention.

A typical sensor according to the invention is outlined in FIG. 1. It consists of a scale 10 having hollow topographic features 11 forming a texture and a cursor 20 with electrodes 21. The gap H, shown in FIG. 2, between scale and cursor remains constant as they move relatively to each other. For the sake of clarity coordinates xyz are shown: x and y define the plane locally tangent to the texture formed by the topographic features 11 of the scale 10, z being perpendicular to it. The topographic features 11 of the scale 10 shown in FIG. 1 are periodically arrayed along the x axis; likewise, a number of electrodes 21 are also periodically arrayed along this axis on the cursor 20; thus, the topographic features 11 will influence the capacitances between electrodes 21 as a function of the position X of the cursor 11 along the x axis. Of course, other parameters, such as the gap H between scale 10 and cursor 20, the scale material and the shape of the topographic features 11 also affect these capacitances. Suitable electrode geometries and measuring methods are to be chosen to minimize the influence of said other parameters.

Figure 2A:
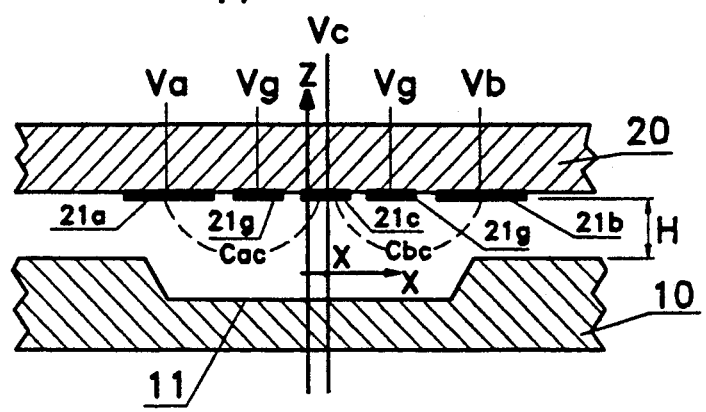
FIG. 2a is a cutaway view of said first embodiment.
Figure 2B:
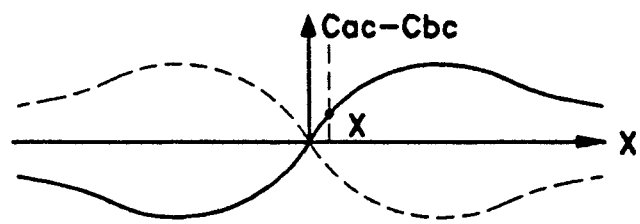
FIG. 2b shows the differential capacitance of said first embodiment as a function of the displacement x between cursor and scale.

According to the invention, this is done by configuring the cursor electrodes 21 into one or several differential capacitors measuring the difference between two coupling capacitances. FIG. 2a shows a cutaway view (in the xz plane) of such a configuration comprising two transmitting electrodes 21a, 21b, and one receiving electrode 21c, all of rectangular shape, not seen in FIG. 2a as they are in a plane perpendicular to the xz plane. Transmitting electrodes 21a, 21b, of same size, are tied respectively to a.c. voltages Va, Vb, of same amplitude and frequency but opposite polarity. The receiving electrode 21c is equidistant from both driving electrodes 21a, 21b, and separated from them by shielding electrodes 21g of same size and shape tied to a shielding voltage Vg, such as ground or one of the supplies, to prevent unwanted couplings. In the absence of texture of the scale 10 both coupling capacitances Cac between transmitting electrode 21a and receiving electrode 21c and Cbc between transmitting electrode 21b and receiving electrode 21c are equal, the signals coupled to the receiving electrode 21c, equal but of opposite polarity, will cancel each other and the resulting signal will be nil. If a topographic feature 11 of the scale 10, i.e. a depression in FIG. 2a, faces exactly the receiving electrode 21c, both coupling capacitances Cac and Cbc between transmitting and receiving electrodes remain equal as they are equally influenced by said feature 11: the resulting signal remains nil, and this for any gap H between scale 10 and cursor 11. If the topographic feature 11 is not exactly facing the receiving electrode 21c, but offset by a small distance X along the x axis, the coupling capacitances Cac and Cbc will become unbalanced and an a.c. signal with an amplitude proportional to the differential capacitance (Cac-Cbc) will appear on the receiving electrode 21c. FIG. 2b shows said differential capacitance as a function of the cursor displacement X. The solid curve corresponds to a conducting scale 10, the dotted curve to a scale 10 made of a dielectric material. If, for example, the cursor 20 is slightly offset to the right (X>0), the presence of a conducting scale will shield the transmitting electrode 21b more, resulting in a positive differential capacitance (Cac-Cbc), whereas a dielectric scale will increase the coupling between transmitting electrode 21b and receiving electrode 21c, resulting in a negative differential capacitance (Cac-Cbc) for the same cursor offset (X>0). If the topographic feature 11 had not been hollow, as shown in FIG. 2a, but raised, the differential capacity would have been of opposite sign to the one found above. In any case, the described sensor will be very sensitive to displacements along the x axis, but insensitive to the first degree to those along the y and z axis, at least for small shifts from the equilibrium position (X=0) where the differential capacitance (Cac-Cbc) is nil.

The shielding electrodes 21g limit couplings between transmitting electrodes 21a, 21b, and receiving electrodes 21c to the gap between scale 10 and cursor 20. If said cursor 20 is a dielectric, such as a printed circuit board or a ceramic substrate, it may be necessary to put an additional shielding electrode on the back of said cursor, to avoid any coupling through its dielectric. If the cursor is an integrated circuit chip, the electrodes are only insulated by a thin oxide layer, and the substrate may be doped to become conducting enough to act as a shielding electrode, if necessary.

The practical use of the electrode arrangement shown in FIG. 2a is limited to measuring small displacements or detecting some determined positions, such as absolute reference marks on incremental scales: due to its periodicity, an incremental scale allows an absolute measurement only within one period. A power interruption, excessive displacement speed or noise may cause a position display error equal to an integer number of periods. Reference marks allow a coarse determination of position by pointing to the correct period, thus avoiding or at least detecting position errors. An absolute reference mark should give a "true" signal within a limited interval and a "false" signal elsewhere.

Figure 3A:
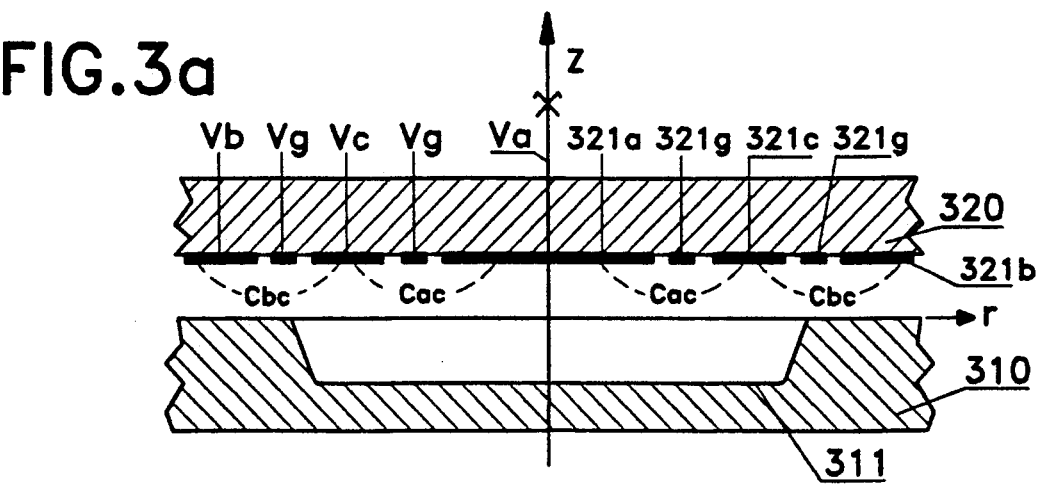
FIG. 3a is a cutaway view of an annular embodiment.
Figure 3B:
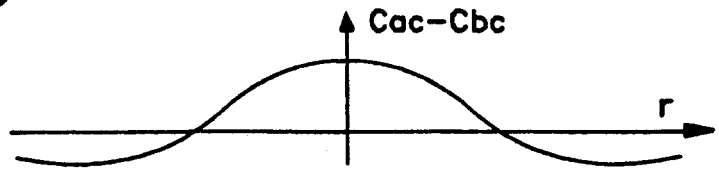
FIG. 3b shows the differential capacitance of this second embodiment as a function of the displacement between cursor and scale.

FIG. 3a shows a cutaway view of such a sensor, suitable for use as a reference mark. The topographic feature 311 of the scale 310 and the electrodes of the cursor 320 have an axis of symmetry (z) when facing each other. Electrodes 321b, g, c, g, a form concentric rings on the surface of the cursor, the receiving electrode 321c being between the transmitting electrodes 321a, 321b connected to a.c. signals Va, Vb, and separated from them by shielding electrodes 321g, connected to a shielding potential Vg. The topographic feature 311 used as reference mark also has a circular shape, and is hollow in FIG. 3a, the scale being assumed conducting. The differential capacitance will then be positive when the cursor faces the hollow topographic feature and negative if it is not the case: FIG. 3b shows the differential capacitance (Cac-Cbc) as a function of the offset r in the xy plane between said feature 311 and cursor 320. To avoid the risk of ambiguous readings due to the return of the differential capacitance to zero for large values of r, the area of electrode 321b or its proximity to electrode 321c might be increased. This sensor may be used for two dimensions. A possible application consists in a scale whose topographic features are periodic along x and y and in a cursor having several sets of concentric electrodes 321b, g, c, g, a also arrayed periodically along x and y, the periods of scale and cursor being slightly different, thus providing a kind of two dimensional "vernier", able to find the cursor position (X,Y) from the mapping of "true" and "false" states measured on each one of the set of electrodes 321b, g, c, g, a. Lastly, if the sensor of FIG. 3a is to be used as an absolute reference along one axis, a rectangular electrode shape might be more optimal, but the measuring principle will remain the same.

The embodiments described above might be affected by potential differences between scale and cursor, e.g. from ground loops, static charges or the vicinity of electrical noise sources, this even though the signal coming from the transmitting electrodes, having a known waveform and frequency, may be selectively filtered.

Figure 4:
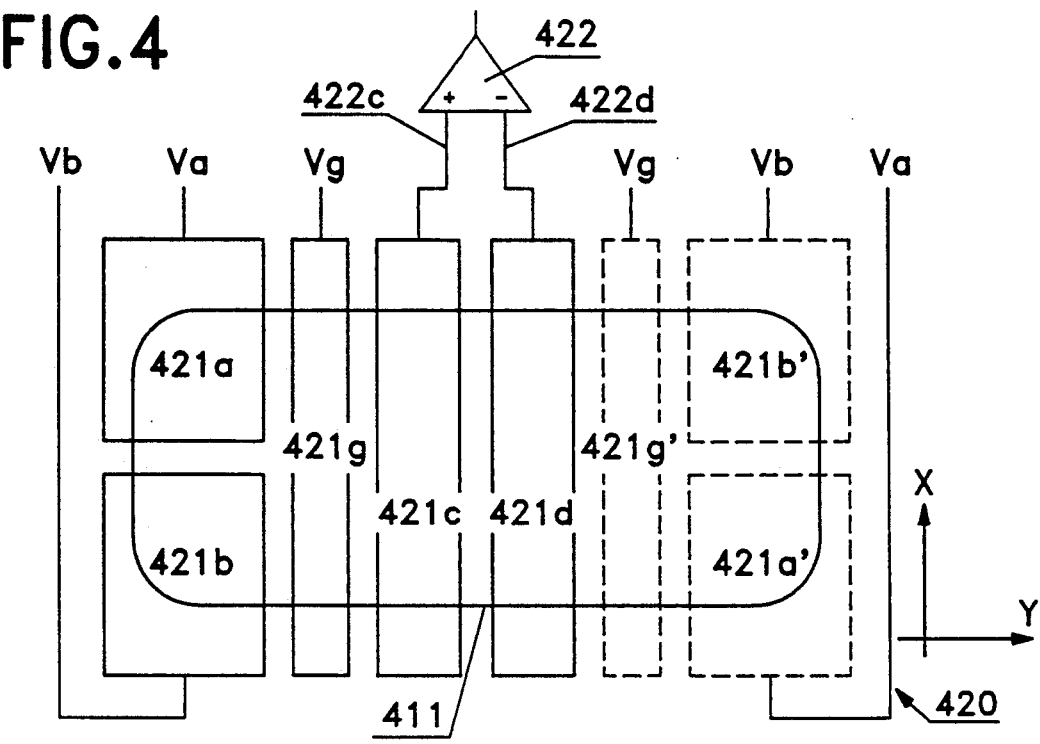
FIG. 4 shows the cursor electrode geometry of a third embodiment with the superposed outline of a scale topographic feature.

A cursor having an electrode configuration as shown in FIG. 4 and described herein can reduce the influence of such perturbations by at least an order of magnitude essentially by the presence, along receiving electrode 421c, of a second receiving electrode 421d acting as reference or differential electrode. The receiving electrodes 421c, and 421d are connected respectively to the inputs 422c and 422d of a differential amplifier 422. Transmitting electrodes 421a, 421b electrode 421d being farther away. A shielding electrode 421g separates the driving electrodes 421a, 421b from the receiving electrodes 421c, 421d. The transmitting electrodes 421a, 421b being respectively connected to a.c. signals Va, Vb of same amplitude and frequency and opposite polarity, a non zero a.c. signal will be picked up be receiving electrodes 421c, respectively 421d, if the topographic feature 411 of the scale 10 facing said electrodes provokes non zero differential capacitances (Cac-Cbc) respectively (Cad-Cbd). The signal picked up by electrodes 421c will be stronger than the one picked up by electrode 421d, farther away from transmitting electrodes 421a, 421b. The capacitance between two parallel elongated electrodes lying on a ground plane decreases roughly with the square of their spacing, but in the presence of another grounded plane, here the scale, the attenuation becomes stronger and the decrease of capacitance with spacing tends to be exponential. It is thus possible to have a very narrow space between both receiving electrodes 421c and 421d while retaining a strong amplitude difference between their picked-up signals. Such a layout will be sensitive to signals from transmitting electrodes 421a, 421b, as a differential signal will be picked up by the pair of receiving electrodes 421c, 421d and amplified by the differential amplifier 422, while remaining unsensitive to signals due to potential differences between scale 410 and cursor 420, as the capacitances from each receiving electrode 421c, 421d to the scale are practically equal, so that these signals due to potential differences effectively cancel each other.

But if the potential differences between the scale 410 and the cursor 420 are caused by the transmitting electrodes of the cursor, which may be the case for a conducting scale insulated from the cursor, the resulting differential signal due to a slight imbalance of the capacitances between the scale and each receiving electrode cannot be disregarded as it is identical to the directly coupled signal so that it cannot be selectively filtered out. The transmitting electrode arrangement must be so that for any position of the cursor 20 the sum of the signals coupled from transmitting electrodes 421a, 421b to scale remains ideally zero. This is achieved by supplementary transmitting electrodes 421a' and 421b' respectively connected to Va and Vb, and by a supplementary shielding electrode 421g', connected to Vg, shown by their dotted outline in FIG. 4. The sequence of electrodes 421a' and 421b' along x is the inverse of electrodes 421a, 421b, but while the latter are closer to receiving electrode 421c, the former are closer to receiving electrode 421d. So, if the topographic feature 411 is moved so as to increase coupling from transmitting electrode 421a and decrease coupling from transmitting electrode 421b, an a.c. signal with the polarity of Va will appear mainly on receiving electrode 421c; for the same position, said topographic feature 411 also decreases coupling from electrode 421a' and increases coupling from electrode 421b', an a.c. signal with a polarity opposed to Va will appear mainly on receiving electrode 421d. As both receiving electrodes 421c, 421d are connected to a differential amplifier 422 the signals reinforce each other, which is advantageous. As to the sum of signals coupled to the scale from transmitting electrodes 421a, 421b, 421a', 421b', it will remain zero as scale and cursor of FIG. 4 have a symmetry plane, symmetrical transmitting electrodes being connected to signals of opposite polarities.

All sensors described above have a limited measuring range with a sufficient linearity only in the vicinity of X=0, i.e. when a scale topographic feature 411 faces cursor electrodes 421. One possibility to extend the range and/or improve the resolution which has been mentioned above as a possible application of the sensor shown in FIG. 3a, is to put a periodic array of several electrode configurations, e.g. as shown in FIGS. 2a, 3a, 4, on a cursor and a periodic array of several topographic features 411 on a scale, both arrays having slightly different pitches, so as to get a "vernier" effect. For example, a sensor measuring along the x axis could have a scale whose texture period, i.e. the distance between identical topographic feature 411 forming said texture, would be 1 mm, and a cursor having ten electrode sets spaced along x with a period of 1.1 mm; if for X=0 the first set of electrodes faces a scale topographic feature 411, the nine other sets will be offset from the scale topoqraphic features 411 closed to them; for X=0.1 mm the second set of electrodes will be exactly across a scale topographic feature, for X=0.2 mm a third, etc. The use of this "vernier" effect allows longer measuring ranges but needs a large cursor surface, especially if a fine positional resolution is wanted; moreover only sets of electrodes sufficiently close to scale topographic features, thus sensitive enough, will contribute to the position evaluation.

A better way to overcome range and resolution limitations is by having a sensor according to the invention whose cursor 520 comprises an array of identical electrodes 521 and switching means allowing the configuration of groups of electrodes 521 connected to a same conductor tied to Va, Vb, Vg, or the input of an amplifier in case receiving electrodes are also part of the array. By appropriate switching means, array electrodes 521 may for example be configured as transmitting electrodes which may be displaced along a measuring axis by adding an electrode on one side and removing one on the other. If the pitch of said array electrodes corresponds to the resolution, the switching means may be of the type described in U.S. Pat. No. 3,857,092 wherein the electrical configuration of the electrode array is switched so as to "follow" the floating scale electrodes or, in the present case, the topographic features. An alternative way is to constantly shift the electrical configuration of said array electrodes so as to "scan" the scale, the position being then evaluated by a zero-crossing or a phase-shift method, e.g. by using the zero crossings of the demodulated signal on the receiving electrode disclosed in U.S. Pat. No. 4,437,055, claims 6 and 7. If a much finer resolution than said electrode pitch is sought, the shifting of the electrical configuration may be done only over a fraction of the array at any time, as disclosed in U.S. Pat. No. 4,841,225.

Figure 5:
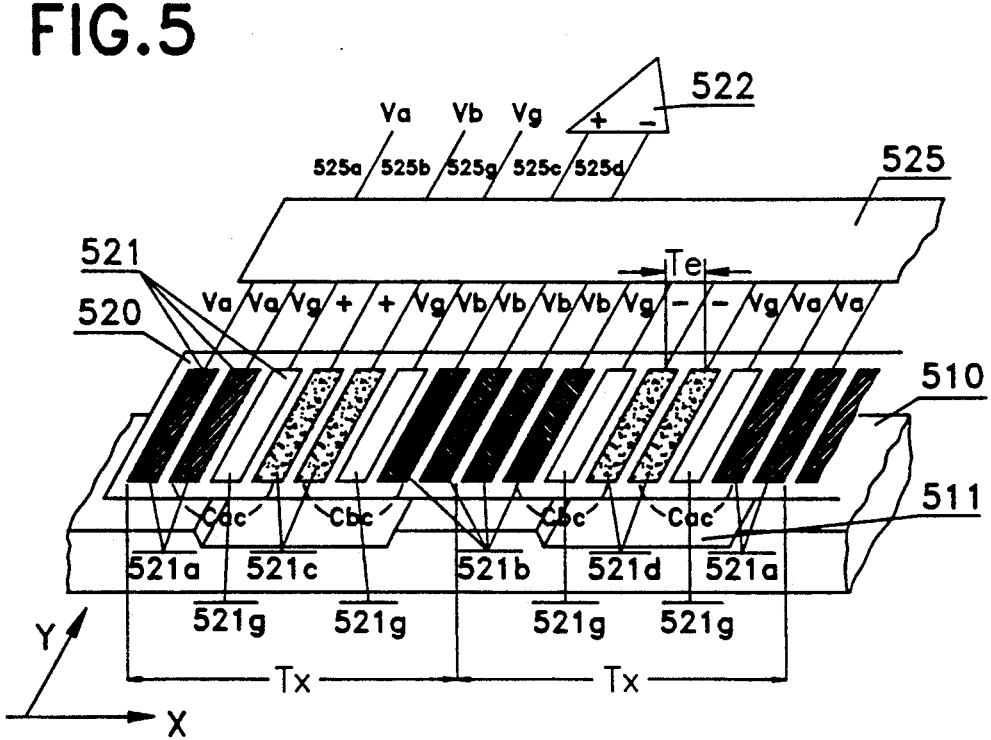
FIGS. 5 and 6 are perspective views of a fourth and fifth embodiment of the invention.

The principle of a sensor according to the invention which overcomes these range and resolution limitations is shown in FIG. 5. A scale 510 has a periodic texture along the x axis, the period between topographic features 511 forming said texture being Tx. A cursor 520 comprises an array of identical electrodes 521 having a pitch of Te between electrodes. As there are eight electrodes per scale pitch Tx, Te=Tx/8. Switching means 525 allow the connection of any array electrode 521 to one of the following lines: line 525a tied to a.c. signal Va, line 525b tied to a.c. signal Vb of same amplitude and frequency as Va but of opposite polarity, line 525g tied to a shielding potential Vg, lines 525c and 525d tied to the inputs of a differential amplifier 522. A signal distribution given by said switching means 525 on the array electrodes 521 is shown in FIG. 5. Taking the first eight electrodes from the left, two electrodes 521a are connected to line 525a, thus to Va, one electrode 521g is connected to line 521g, thus to Vg, two electrodes 521c are connected to line 525c, thus to one input of the differential amplifier 522, one electrode 521g is connected to line 525g, thus to Vg, and two electrodes 521b are connected to line 525b, thus to Vb. One topographic feature 511 of the scale 510 faces some of these eight electrodes. Over one scale texture pitch Tx, the electrode configuration is essentially the same as described in FIG. 2a and accompanying text. FIG. 5 shows two electrode groups 521a and 521b connected to signals Va and Vb, and FIG. 2 shows two electrodes 21a and 21b connected to Va and Vb. These two electrode groups, respectively electrodes, are on both sides of an electrode group 521c, respectively electrode 21c, connected as a receiving electrode and tied to an amplifier. Electrode groups 521a, b, c, respectively electrodes 21a, b, c, are separated by electrodes 521g connected to Vg, respectively shielding electrodes 21g connected to Vg and/or a conducting substrate. For convenience, coupling capacitances are similarly defined in FIGS. 5 and 2a by extending the definition to electrode groups: e.g. Cac defines the capacitance between a group of electrodes 521 connected to line 525a, thus to Va, and a group of electrodes 521 connected to line 525c tied to an amplifier input.

The same signal distribution may repeat itself over the next eight electrodes, i.e. over the next scale topographic feature 511. This is not the case here, where the signal distribution only repeats itself every sixteenth electrode 521, i.e. over a period 2 Tx, as FIG. 5 shows. In fact, the signal distribution over the next scale topographic feature differs from the preceding one in that the a.c. voltage polarities are inverted, as Vb replaces Va and vice-versa, and that electrodes 521 connected as receiving electrodes are tied to the other input of the differential amplifier 522. With such a signal distribution, assuming a conducting scale with hollow topographic features 511, a small displacement of the cursor to the right will result in a signal with the polarity of Va, as Cac is larger than Cbc across the leftmost topographic feature 511, picked up by receiving electrode group 521c tied to one input of differential amplifier 522, and in a signal with the polarity of Vb, as Cac is smaller than Cbc across the next topographic feature, picked up by electrode group 521d tied to the other input of differential amplifier 522.

A small displacement of the cursor 520 thus results in a differential a.c. signal on the inputs of differential amplifier 522, whereas potential differences between scale and cursor will equally affect both amplifier inputs, practically not contributing to the differential signal. Because of its completely differential configuration of transmitting as well as receiving electrodes over the interval 2Tx, this sensor has essentially the same advantages as the one described in reference to FIG. 4, i.e. insensitivity to potential differences between scale and cursor and no net signal coupled to the scale by the transmitting electrodes.

The signal distribution of the array of electrodes 521 can be moved left or right by the switching means 525 so as to "track" the topographic features 511 of the scale 520 by using the output signal of amplifier 522 as an error signal, like in a servo loop. Alternatively, the signal distribution may "scan" the array of electrodes 521 and use the zero crossings of the envelope of the amplifier 522 output signal to find the position of the cursor 520 relative to the scale 510.

Integrating the receiving functions in an array of electrodes 521, i.e. connecting some of them to the inputs of a differential amplifier 522 through lines 525c and 525d and through switching means 525 puts severe constraints on the design of the latter, in order to avoid any unwanted couplings of a.c. signals, especially Va and Vb, to these lines 525c and 525d. Said switching means may for example not just have simple switches such as single field-effect transistors, as the source to drain feedthrough capacitance in the "off" or non-conducting state cannot be neglected here. The array electrodes 521 should thus be connected to lines 525a, b, c, d through two such switches in series, a third switch, turned "on" to ground the conductor between said two switches when these are "off or nonconducting so as to suppress signals capacitively coupled from electrodes connected to Va or Vb to lines 525c, 525d through these "off" switches.

Figure 6:
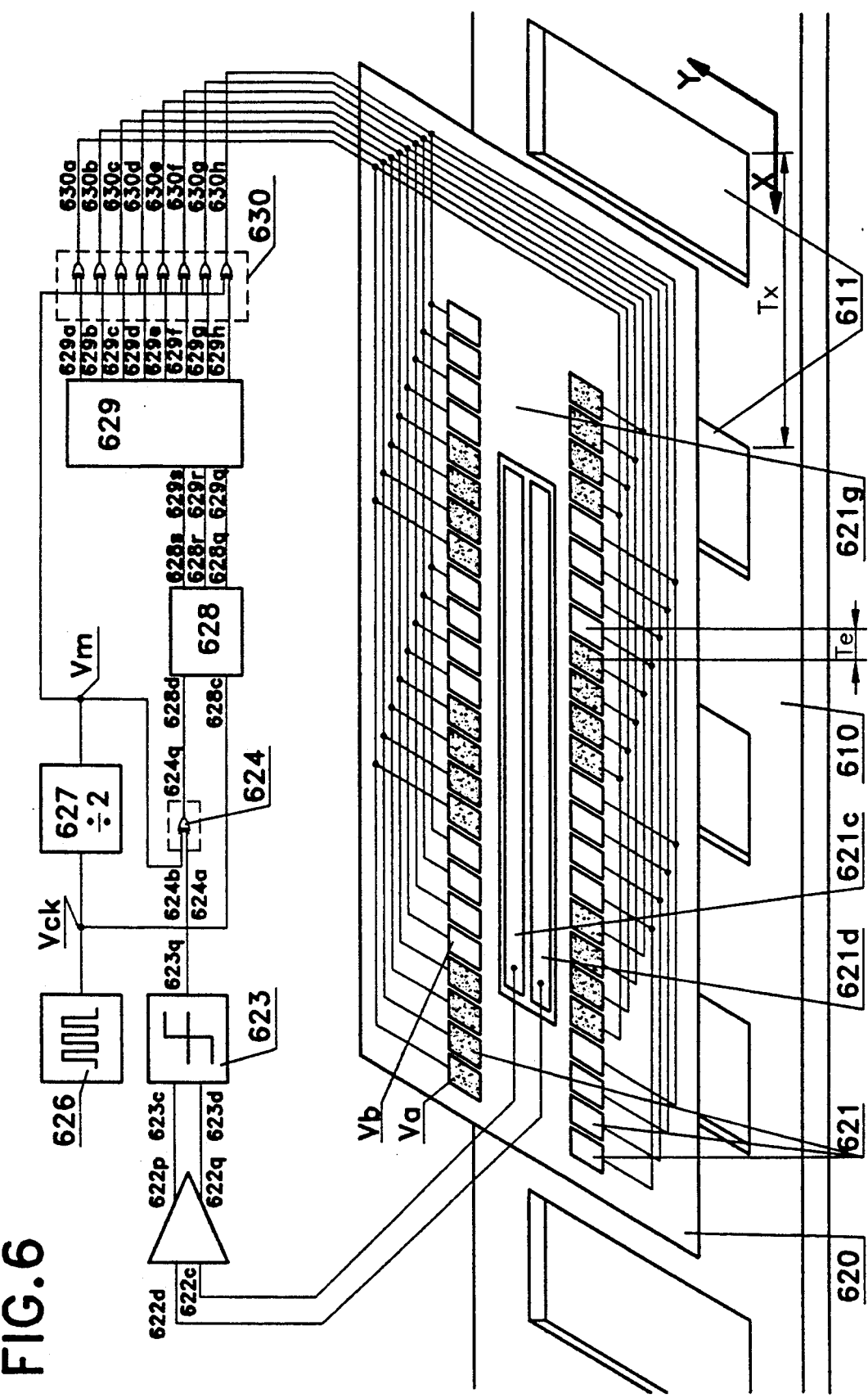

A sensor conforming to the invention and having the same advantages as the previous one, but requiring only simple switching means and allowing easier shielding of the receiving electrodes and their interconnections is shown in FIG. 6. A cursor 620 is shown in perspective view over a scale 610 having topographic features 611 arrayed along the x axis to form a texture of period Tx. The cursor 620 comprises two arrays of transmitting electrodes 621 aligned along the x axis, as well as two elongated receiving electrodes 621c, 621d located between these arrays and also aligned along the x axis. Shielding electrodes 621g surround both receiving electrodes 621c, 621d. The length along x of receiving electrodes 621c, 621d is an integer number of periods Tx, and the transmitting electrode arrays are a bit longer to maintain essentially unchanged coupling capacitances over the extension of the receiving electrodes. Actually, coupling capacitances decrease so fast with distance that a transmitting electrode array overlap of Tx/2 on each end is normally enough. It would also be possible to have transmitting electrode 621 arrays a bit shorter than the receiving electrodes 621c, 621d. In this case it is the transmitting electrode 621 arrays which must extend over a round number of periods Tx. For the sake of clarity in FIG. 6, array electrodes 621 have a pitch Te equal to Tx/8, i.e. eight electrodes over one pitch Tx. In practice, Tx would be of the order of a millimeter and the array electrode pitch would be as fine as possible to get enough resolution without complex interpolation means. On an integrated circuit Te could range from a few micrometers to a few tens of micrometers to achieve resolutions of a micrometer as described later. The need for a small pitch Te, geometrically accurate electrode shapes and a high flatness of the electrode surface because of the strong influence of distance on coupling capacitance, along with the possibility of integrating the electronic circuitry on the cursor 620, make an integrated circuit cursor quite interesting.

FIG. 6 also shows the block diagram of an electronic circuit which can be used with the described sensor. For clarity this block diagram is drawn outside the cursor 620 but as aforesaid the electronic circuit may be implemented on or off said cursor. In any case, precautions have to be taken to avoid unwanted couplings; as the receiving electrodes 621c and 621d are here clearly separated from the rest, the precautions to be taken are well known and consist for example in bringing the differential amplifier 622 as close to the receiving electrodes as possible. The circuit works as follows: the differential a.c. signal picked up by receiving electrodes 621c and 621d is brought to inputs 622c and 622d of a differential amplifier 622. The outputs 622p, 622q of the latter are connected to the inputs 623c, 623d of a comparator 623 which transforms the differential a.c. signal in a digital signal. The comparator output 623q is connected to the input 624a of an exclusive-or gate 624 having its other input fed by a modulating signal Vm, also used for modulating the transmitting electrode 621 signals Va and Vb. Consequently, the signal on the output 624q of gate 624 represents the polarity, relatively to signals Va or Vb, of the differential signal picked up by receiving electrodes 621c and 621d. In other words, said exclusive-or gate 624, as it removes the modulation component from said signal, is a demodulator. The a.c. signal Vm is derived from the clock signal Vck, generated by an oscillator 626 and passed through a frequency divider 627. Said clock signal Vck is also connected to the counting input 628c of a binary up/down counter 628, which thus always counts up or down according to the state of the signal on the output 624q of gate 624 connected to the up/down input 628d of said counter 628. The outputs 628q, 628r, 628s of respective weights 1, 2, 4 of counter 628 are respectively connected to inputs 629q, 629r, 629s of a decoder 629 generating the following cyclical code on its outputs 629a to 629f as a function of the 3 bit binary input code:

| decoder inputs | | | decoder outputs | | | | | | | |
|---|---|---|---|---|---|---|---|---|---|---|
| s | r | q | a | b | c | d | e | f | g | h |
| 0 | 0 | 0 | 0 | 0 | 0 | 0 | 1 | 1 | 1 | 1 |
| 0 | 0 | 1 | 1 | 0 | 0 | 0 | 0 | 1 | 1 | 1 |
| 0 | 1 | 0 | 1 | 1 | 0 | 0 | 0 | 0 | 1 | 1 |
| 0 | 1 | 1 | 1 | 1 | 1 | 0 | 0 | 0 | 0 | 1 |
| 1 | 0 | 0 | 1 | 1 | 1 | 1 | 0 | 0 | 0 | 0 |
| 1 | 0 | 1 | 0 | 1 | 1 | 1 | 1 | 0 | 0 | 0 |
| 1 | 1 | 0 | 0 | 0 | 1 | 1 | 1 | 1 | 0 | 0 |
| 1 | 1 | 1 | 0 | 0 | 0 | 1 | 1 | 1 | 1 | 0 |

The zeroes and ones of the table above represent logic states, e.g. negative and positive supply potentials. The output pattern as shown shifts to the right if the counter 628 counts up, and to the left if it counts down. The decoder outputs 629a to 629h go through a modulator 630 consisting of eight exclusive-or gates having one of their inputs tied to one of said decoder 629 outputs 629a to 629h and their other input to the modulation signal Vm. The outputs of the modulator 630 are bussed to the electrodes of both arrays. As the connecting lines in FIG. 6 show, the electrodes of the first array, at the top of FIG. 6, are connected to modulator 630 outputs in the sequence 630a, b, c, d, c, e, f, g, h, a, b, c, etc., whereas the electrode of the second array, at the bottom of FIG. 6, are connected in the sequence 630e, f, g, h, a, b, c, d, e, f, etc., so that corresponding electrodes of each array, having the same X coordinate will always carry a.c. signals of opposite polarity as they are connected through the modulator 630 to decoder 629 outputs spaced four apart, thus always complementary, as can be seen from the truth table.

Assuming that the three outputs 628q, r, s are zero, and arbitrarily calling Va the a.c. signal having the same polarity as the modulation signal Vm on the array electrodes 621, and Vb those of polarity opposed to Vm, the a.c. signal sequence on the transmitting electrodes 621 over the interval Tx becomes Va, Va, Va, Va, Vb, Vb, Vb, Vb for the first array and Vb, Vb, Vb, Vb, Va, Va, Va, Va for the second array; both sequences are effectively of opposite polarity. For more clarity array electrodes 621 connected to Vb are shaded. It appears that the signal pattern over one of the scale topographic features 611 is the same as shown in FIG. 4, including electrodes with dotted outline. Here again, electrode groups in. FIG. 6 play the same role as signal electrodes in FIG. 4. Groups of four first array electrodes 621 connected to Va in FIG. 6 correspond to electrode 421b in FIG. 4, groups of four first array electrodes 621 connected to Vb corresponds to electrode 421b, groups of four second array electrodes 621 connected to Va correspond to electrode 421a', and groups of four second array electrodes connected to Vb correspond to electrode 421b'. Receiving and shielding electrodes are the same. So, this sensor has essentially the same advantages as the one referred to in FIG. 4, i.e. insensitivity to potential differences between scale and cursor, zero sum of signals coupled to the scale from the cursor 620 to the scale 610, but with an unlimited range and an improved resolution.

If the cursor 620 moves slightly along the scale 610, a differential a.c. signal will appear between receiving electrodes 621c, 621d, given that the signals preferentially coupled on each one by the closest transmitting electrode 621 array will have opposite polarities. This differential signal will be amplified by the differential amplifier 622, converted to a digital signal (with two logical levels) by the comparator 623, demodulated in the exclusive-or gate 624 with reference to a.c. signal Vm, to ultimately determine the counting direction, up or down, of the counter 628, which will thus oscillate around some average value representing the position.

The desired resolution being normally finer than the pitch Te of the array electrodes 621, some averaging or filtering using successive counter values has to be done, either by additional electronic circuitry or by a microcontroller programmed for this. An averaging takes for example the sum of N successive counter 629 values and divides that sum by N. A first order digital low-pass filter constantly adds the current counter value divided by N to a running total while subtracting one Nth of said total from itself. Such algorithms are known and easy to implement in hardware or software. But to avoid nonlinearities over the pitch Te, a certain position uncertainty having a standard deviation of at least Te/2 is helpful, such as arising from thermal noise, but it may also be introduced artificially. But a finer resolution may also be obtained by other means, e.g. by shifting only a fraction of the array electrodes at any time, as disclosed in U.S. Pat. No. 4,841,225, instead of shifting the distribution on all array electrodes at once.

The integration of the electronic circuitry and the electrodes on a single semiconductor chip offers many advantages mentioned above for sensors according to the invention but in such a case the capacitance due to the very thin insulating layer between receiving electrodes and substrate, much larger than coupling capacitances Cac, Cbc, Cad, Cbd, will reduce picked-up voltages to the microvolt level. Hence the importance of the differential amplifier input stage design and layout: it should be as near as possible to said receiving electrodes and insulated and/or shielded from the rest of the electronics; it is conceivable to use the gate of a field-effect transistor as a receiving electrode or even to dispense with the gate altogether, the channel of said transistor then acting as a receiving electrode, but the capacity between channel and substrate might be too large: a more classical layout with the electrode on thick oxide, at least partly separated from the transistor gate, seems better. Two input stage circuits are of interest here, as they both tend to eliminate the influence of said electrode to substrate capacitance.

The first is the charge amplifier, e.g. described in "Measurement Systems: Applications and Design" by E. O. Doebelin, Library of Congress No. 66-8475, pp. 623-625. By using a capacitor in the negative feedback path from output to inverting input of an operational amplifier, the input, here a receiving electrode, is held at a virtual zero, thus avoiding a capacitive loss current to the substrate. For this, the amplifier needs a high open-loop gain and bandwidth, as the capacitance to the substrate adds itself to its input capacitance. The advantage of the charge amplifier lies in the ease of shielding the receiving electrode, including in a differential con-figuration, where both receiving electrodes may be over the same metal or diffusion shield.

The second circuit is the field-effect transistor used as a source follower, the gate being the input and the source the output. Voltage gain is almost one, input impedance very high and output impedance low enough. To cancel the effect of said capacitance to substrate, a diffusion well or a metal layer under the electrode should be connected to the output of the follower, which will thus increase the output signal amplitude. Also here, a high bandwidth is needed because of this bootstrapping effect.

Figure 7A:
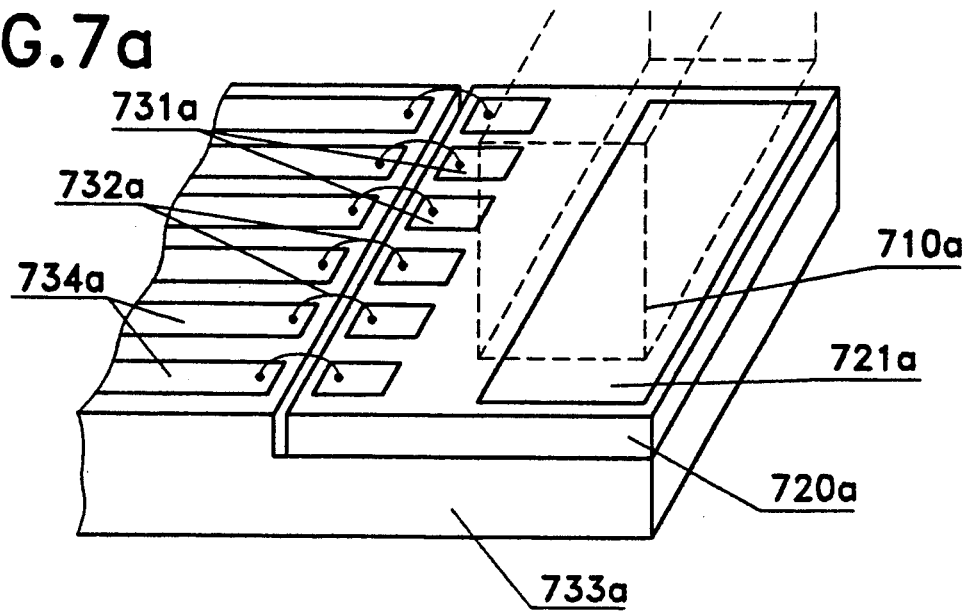
FIG. 7a is a perspective view of an integrated circuit acting as a cursor.
Figure 7B:
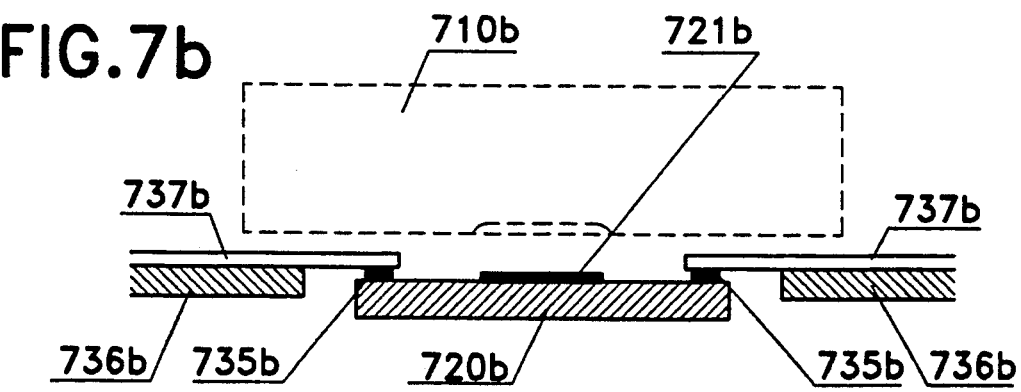
FIG. 7b is a cutaway view of an integrated circuit acting as cursor and held on a carrier by its interconnections.
Figure 7C:
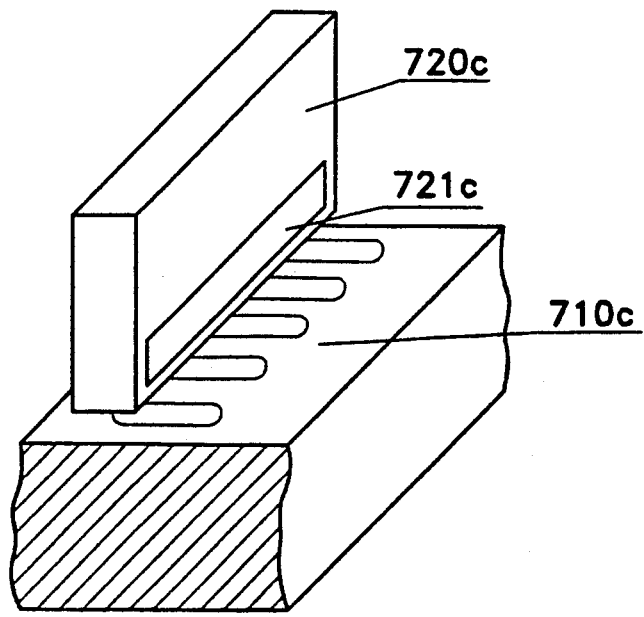
FIG. 7c is a perspective view of a cursor whose electrode plane is perpendicular to the scale plane carrying the texture.

A few possible cursor 720 embodiments according to the invention are shown in FIG. 7a, 7b, 7c, the relative position of the scale 710 being shown in dotted lines. FIG. 7a shows a cursor 720a consisting of an integrated circuit. The electrodes 721a, shown by their outline, occupy the right side of the circuit, facing the scale 710a. Bonding pads 731a are on the left side. Bonding wires 732a connect these pads to connecting lines 734a of a cursor support 733a. The rest of the cursor surface contains electronic circuitry. Such an embodiment is suited for narrow scales 710a which do not interfere with the bonding wires 732a and their protection coating, not shown. FIG. 7b also shows a cursor 720b consisting of an integrated circuit, having "bumps" 735b on two sides, connected by "tape automated bonding" to the conductors 737b of a support 736b. The electrodes 721b, shown by their outline, extend along the middle of the cursor 720b, the rest of the surface containing the electronic circuitry. If a gap H of at about 0.1 mm between cursor 710b and scale 720b is feasible, the latter may extend over the connections and conductors 737b, and not be limited in its width.

To protect such cursors, they may be conformally coated or encapsulated in a packages thin enough to avoid a too large gap H between scale and cursor surface. If a better protection is required, especially of the cursor part exposed to the scale, a thin dielectric plate may be placed between cursor and scale, or the cursor electrodes may be put on the far side from the scale of the thin dielectric plate itself, with coupling done in both cases through the plate. FIG. 7c shows an embodiment which is easy to protect as the plane of cursor 720c electrodes 721c is perpendicular to the scale 710 texture plane: this becomes possible by putting the electrode array 721c as close to the cursor edge facing the scale in order to keep a sufficiently narrow gap between electrodes and texture. An electrode arrangement like the one in FIG. 5 would suit itself well to this embodiment, as all array electrodes can be put very close to the edge. The cursor 720c can thus be well protected, only its edge being close to the scale 710c.

Figure 8A:
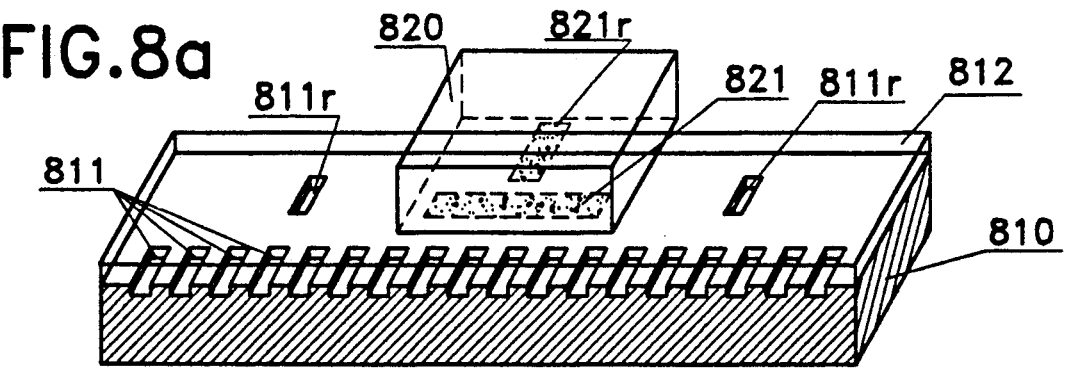
FIG. 8a shows a linear scale whose texture is filled by a dielectric coating.
Figure 8B:
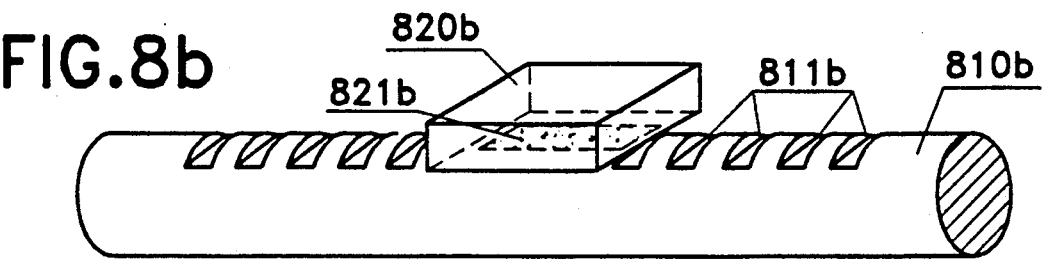
FIG. 8b shows a linear scale made of a cylindrical rack.
Figure 8C:
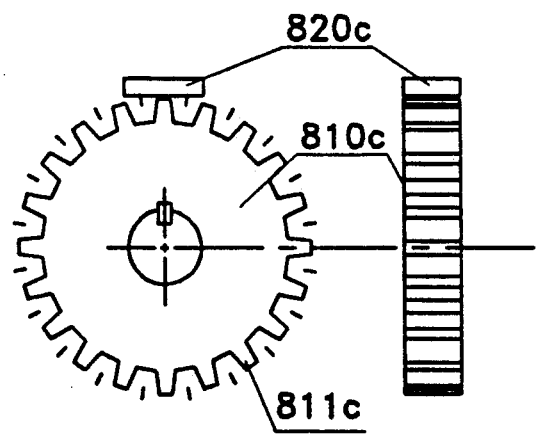
FIG. 8c shows a circumferential scale made of a pinion.
Figure 8D:
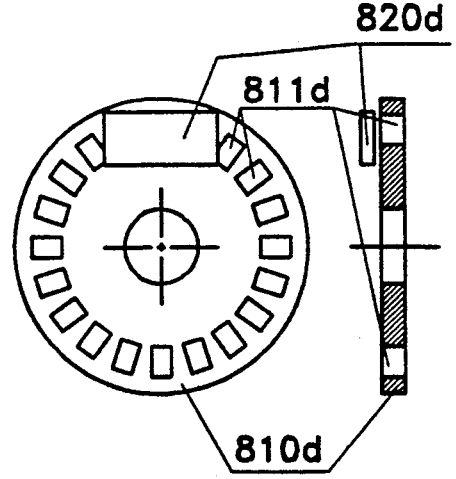
FIG. 8d shows a circumferential scale stamped or etched out of a thin plate.
Figure 8E:
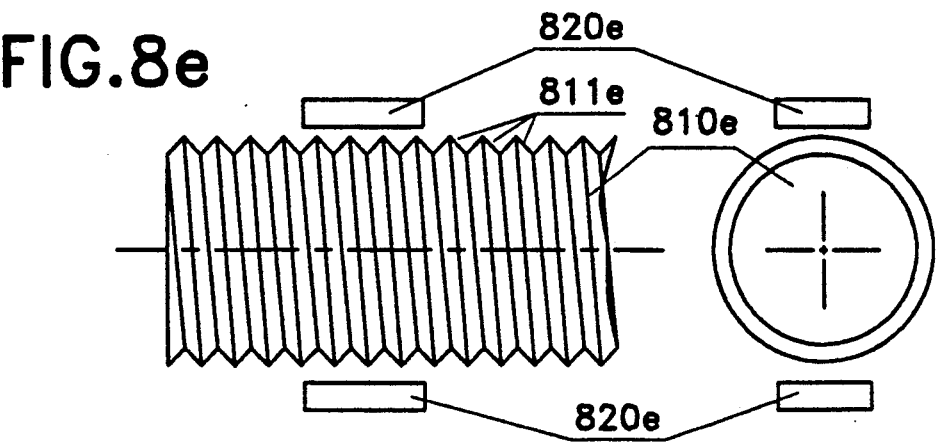

An interesting advantage of sensors according to the invention resides in the diversity of suitable scales and in their simple construction. FIGS. 8a to 8e illustrate a few embodiments of linear and curvilinear scales according to the invention, compatible with the type of cursors described above. FIG. 8a shows a linear scale 810 with topographic features 811 periodically aligned along a first track, and a few topographic features 811r along a second track, parallel to the first. The texture of the topographic feature 811 allows an incremental measurement, e.g. as described in reference to FIGS. 5 and 6. The second track topographic features 811r are used as reference marks. Accordingly, the cursor 820 comprises an electrode arrangement 821, of the type shown in FIGS. 5 or 6 and, outlined in FIG. 8a, for the incremental measurement along said first track, and one or more electrode arrangements 821r for reading the topographic features 811r used as reference marks, said arrangements being of the type shown in FIGS. 2, 3 or 4.

The scale 10 is additionally coated with a dielectric 812 to get a smooth surface, thus preventing dust or other contaminants from filling the hollow topographic feature 811 and 811r. Said dielectric may either fill these hollow features, or just cover them, e.g. for hard dielectrics shaped as a thin plate. A variant consists in having said scale topographic features 811 in the dielectric 812 on the far side from the cursor 820, said dielectric cover 812 thus becoming the scale, on top of a smooth substrate in this case. Finally, a common graduated scale, such as found on jaw calipers or steel rulers, may be directly used as a scale in a sensor according to the invention, as the texture is already etched.

FIG. 8 shows a cylindrical plunger with a rack machined in it and used as a linear scale 810b: such parts are found in dial indicators, where they are guided by cylindrical bearings. With a flat cursor 820b, it is sufficient to have a narrow electrode arrangement 821b, of the order of 1 mm for a 4 mm plunger diameter, to avoid influencing the measuring result with the curvature of the texture across the measuring axis. FIG. 8c shows a pinion (gearwheel) used as a circumferential scale 810c, the teeth being the topographic features 811c: a very simple rotary encoder may be built this way. Here again the cursor 820c is flat and the scale 810c curved, this time along the measuring path: it is sufficient to have a pinion diameter much larger than the length of the electrode arrangement. FIG. 8d represents a rotary scale 810d consisting in a flat disk with openings, stamped or etched in it, being the topographic feature 811d forming the texture. If the cursor electrodes are not curved, the diameter of the ring formed by the openings 811d must be much larger than the length of the electrode arrangement to avoid nonlinearities. FIG. 8e shows a micrometer screw used as a scale for translation and/or rotation movements and whose thread 811e forms the texture: such screws are quite accurate and often incorporated in measuring instruments where they also serve as adjusting means. For improved accuracy, two diametrically opposed cursors 820e may be used.

Sensors according to the invention may easily be configured for measuring two dimensions. A suitable cursor has been described above. A two dimensional array of electrode sets such as illustrated in FIGS. 2 or 3 having periods along x and y which are slightly different from the corresponding scale texture periods may be used for the determination of X and Y by exploiting the "vernier" effect. Another possibility would consist in an array of electrodes forming rows or columns through switching means. To find Y, an electrical distribution like the one shown in FIG. 5 is formed across y with the electrodes connected in rows (assuming rows are along x), and to find X said distribution is applied along x with the electrodes connected as columns. The cursor thus alternates between the measure of X and y.

A more practical and economic solution consists simply in the use of two linear sensors, or more, on a same cursor and for a same scale: at least one sensor along x, one along y. If they are of the type described in reference to FIGS. 5 or 6, there can be no coupling from sensor to sensor through the scale. The latter should of course have a texture minimizing the influence of one coordinate on the other. An extreme case might be a very narrow electrode configuration; if the texture is made of a grid of holes, a sensor might well be between two rows of holes and not detect anything. This extreme case shows which parameters to optimize to avoid influence between coordinates. First, the effective width of the electrode configuration should be about equal to the texture period, or a multiple of it. Topographic features should not be too small or two isolated to avoid "dead" areas, nor, for the same reason, should the gap H be too small. Optimal values of H are between 0.1 and 0.3 times the texture period for conducting scales, a little more for dielectric scales. Finally, an advantage of said solution with separated sensors for x and y lies in a larger tolerance to angular misalignment between cursor and scale, which is of particular importance for a "mouse", not always aligned with its pad.

Figure 9A:
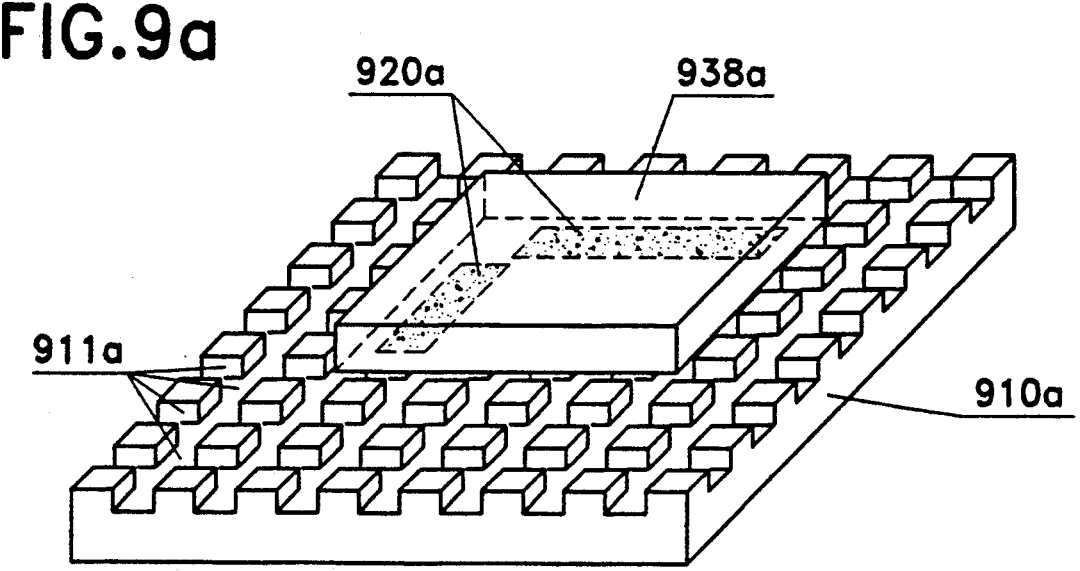
FIG. 9a shows a two dimensional scale whose texture is formed by perpendicular arrays of grooves.
Figure 9B:
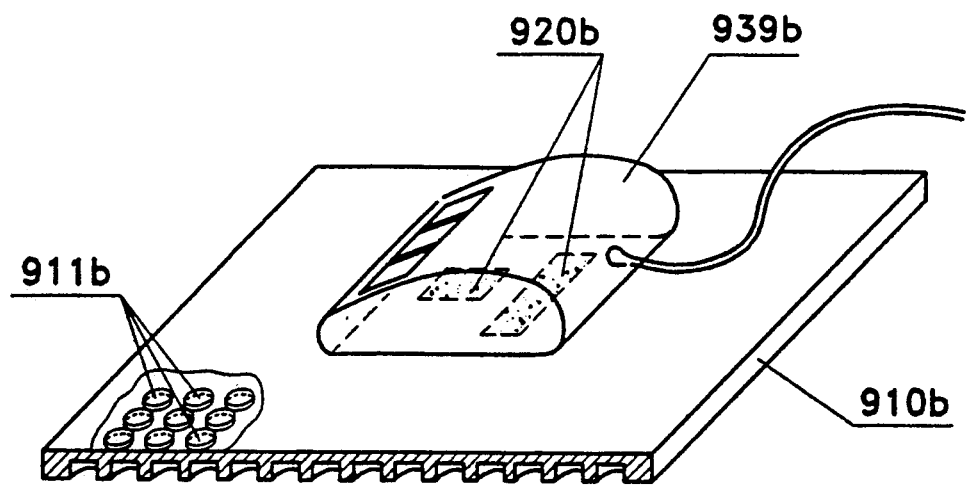
FIG. 9b shows a two dimensional scale made of a dielectric sheet having a texture on the far side from the cursor.

FIGS. 9a and 9b show two examples of two-dimensional scales. The first one, illustrated by FIG. 9a, shows as a scale 910a a metallic or dielectric plate with two perpendicular sets of periodically spaced grooves. Two sensors 920a are on a common support 938a. The second example shown in FIG. 9b comprises a scale 910b, consisting in a dielectric sheet used as "mouse pad" with a "mouse" comprising two sensors 920b. The sheet has a smooth upper surface to facilitate "mouse" travel, but has a texture made of hollow topographic features 911b on the bottom side, read by the sensors 920b through the dielectric sheet.

Other such scales could be made of paper sheets with a texture imprinted by the knurling of the paper drive wheels on plotters. Textiles also have a two-dimensional texture. In this case, and in others described above, it might be of interest to match the period of the electrode signal distribution to the scale texture period, e.g. to use the same cursor in different applications. One possibility is already given by the sensitivity of the cursor to spatial harmonics of the texture. If, for example, the texture profile along the measuring path is square, e.g. grooves in a flat surface, the cursor may "lock" on the harmonic closest to its own period: it is thus possible to have a scale whose period is three times the period of the electrical configuration of the cursor. Alternatively, the switching means may be implemented to allow a choice of several periods. If needed, the correct period may be automatically detected. One possibility would be to scan the array electrode by electrode and to detect the period by the zero crossings of the detected signal.

Of course, the embodiments described above have no limiting character and may get any desirable modification while remaining under the invention. Particularly the invention could be easily adapted to three-dimensional sensors or to sensors having a very large number of electrodes per pitch or textures with both hollow and raised features.

What is claimed is:

1. In a capacitive position sensor comprising a cursor (20) and a scale (10) separated from each other by a predetermined distance (H) and displaceable relative to each other along at least one measuring path (x), the cursor comprising at least two transmitting electrodes (21a, 21b) and at least one receiving electrode (21c) a first means (629) for generating electrical signals to be applied to the transmitting electrodes, second means (623, 624) for evaluating the signal picked up by the receiving electrodes so as to determine the relative position of the cursor (20) relative to the scale (10); the improvement wherein the scale (10) is nonconductive and comprises at least one raised or hollow nonconductive topographical feature (11), said second means processing the signals coupled from the transmitting electrodes (21a, 21b) to the receiving electrode (21c) on the cursor, the topographical feature (11) of the scale (10) being conformed so as to influence said signals coupled to the cursor by modifying mutual coupling capacitances (Cac, Cbc) between said receiving electrodes on said cursor (20) and said transmitting electrodes on said cursor (20) when cursor (20) and scale (10) are displaced relative to each other along the measuring path (x), said mutual capacitances (Cac, Cbc) being indicative of a position of said cursor (20) relative to said scale (10).

2. Capacitive sensor according to claim 1, wherein the electrical signals (Va, Vb) applied to at least two transmitting electrodes (21a, 21b) are a.c. signals (Va, Vb) of same amplitude and frequency but of opposite polarity, the transmitting electrodes being substantially coplanar with the receiving electrode (21c).

3. Capacitive sensor according to claim 2, wherein the scale (510) comprises an array of topographical features (511) forming a periodic texture having a periodicity (Tx) along at least one measuring path (x), the cursor (520) comprising at least one row of electrodes (521) extending along said path, a switching means (525) for connecting each electrode of said row to a respective one of: the a.c. signals (Va, Vb), inputs of a differential amplifier (522), and a shielding potential (Vg); according to a given signal distribution whose period corresponds to the period (Tx) of said periodic texture, said switching means (525) allowing a displacement of said distribution along said electrode row (521).

4. Capacitive sensor according to claim 3, wherein the switching means (525) allow a signal distribution with at least one signal sequence comprising at least one electrode (521a) connected to a first a.c. signal (Va), at least one electrode (521g) connected to a shielding potential (Vg), at least one electrode (521c) connected to a first input (523c) of a differential amplifier (522), at least one electrode (521g) connected to a shielding potential (Vg), at least one electrode (521b) connected to a second a.c. signal, at least one electrode (521g) connected to the shielding potential (Vg), at least one electrode (521d) connected to a second input of said differential amplifier (522), and at least one electrode (521g) connected to a shielding potential (Vg), the period of said signal sequence corresponding to two scale periods.

5. Capacitive sensor according to claim 1, wherein the scale (10) comprises topographical features (11) periodically arrayed with a given pitch along a first measuring path, the cursor (20) comprising sets of electrodes periodically arrayed along the same path, but with a slightly different pitch so as to produce an effort similar to that obtained by a vernier.

6. Capacitive sensor according to claim 5, wherein the topographical features (11) of the scale (10) are periodically arrayed with a given pitch along a second measuring path, the cursor (20) sets of electrodes are also periodically arrayed along that second path with a slightly different pitch so as to produce an effect similar to that obtained by a vernier along both first and second measuring paths.

7. Capacitive sensor according to claim 1, wherein the scale is selected from a group consisting of a cylindrical plunger (810b) with a rack in it (811b), a pinion (810c), a rotating disk (810d) having topographical features and a micrometer screw (811c).

8. Capacitive sensor according to claim 1, wherein the scale (810) comprises topographical features (811) covered by a material (812) presenting a smooth surface to the cursor, said material forming a coating over said features (811).

9. Capacitive sensor according to claim 1, wherein the cursor (720a) is an integrated circuit comprising transmitting and receiving electrodes.

10. Capacitive sensor according to claim 1, wherein an electrode plane (721c) of the cursor (720c) is perpendicular to the scale (710c) face provided with topographical features.

11. Capacitive sensor according to claim 3, wherein the switching means (525, 629) is adapted to switch the signals on said transmitting electrodes in sequence, in such a manner as to move the signal distribution on the electrode array so as to track the displacement of the scale (510, 610) relative to the cursor (520, 620).

12. Capacitive sensor according to claim 3, wherein the switching means (525, 629) are adapted to continuously switch the signals on said transmitting electrodes in such a manner so to displace the signal distribution on the electrode array so as to result in a constant speed scan, the relative portion of cursor (520, 620) and scale (510, 610) being obtained by a zero crossing or phase detection method.

13. Capacitive sensor according to claim 3, wherein the signal distribution has a period corresponding to a multiple of the period (Tx) of said periodic texture of said array of topographical features.

14. A capacitive sensor comprising a cursor (20) and a scale (10) separated from each other by a predetermined distance (h) and displaceable relative to each other along at least one measuring path (x), the cursor comprising at least two transmitting electrodes (21a, 21b), at least one pair of receiving electrodes (421c, 421d), a first means (629) for generating electrical signals to be applied to the transmitting electrodes, second means (623, 624) for evaluating the signal picked up by the receiving electrodes so as to determine the relative position of the cursor (20) and the scale (10), wherein the scale comprises at least one topographical feature (11), said receiving electrodes (421c, 421d) being identical and coplanar and connected to said second means through both inputs of a differential amplifier (424), said second means processing the signals coupled from the transmitting electrodes (21a, 21b) to the receiving electrodes (421c, 421d) on the cursor, the transmitting electrodes lying nearer to one (421c) of the receiving electrodes, the topographical feature (11) of the scale (10) being conformed so as to influence said signals coupled to the cursor by modifying mutual and direct coupling capacitances (Cac, Cbc) between said receiving and transmitting electrodes on said cursor when cursor (20) and scale (10) are displaced relative to each other along the measuring path (x), values of said mutual and direct capacitances (Cac, Cab) being indicative of sensed position.

15. Capacitive sensor according to claim 14 wherein for each group of transmitting electrodes (421a, 421b) lying nearer to one (421c) of the receiving electrodes, the cursor (420) comprises another group of identical transmitting electrodes (421a', 421b') lying nearer to the other (421d) receiving electrode, the corresponding transmitting electrodes (421a, 421b'; 421b, 421a') on both sides of the receiving electrodes (421c, 421d) being tied to a.c. signals of same amplitude and frequency, but of opposite polarity, said scale (410) topographical feature (411) being shaped so as to modify by its displacement the coupling capacitances between the transmitting and the receiving electrodes and to obtain a differential signal between both inputs of the differential amplifier (422).

16. Capacitive sensor according to claim 14 wherein the cursor (620) comprises two rows of identical transmitting electrodes (621) aligned along a measuring path (x) and receiving electrodes (621c, 621d) extending along each of said rows, the switching means (629) providing the transmitting electrodes (621) of each row with a.c. signal distributions with are of same amplitude and frequency, but of opposite polarity, said switching means (629) being adapted to switch the signals on said transmitting electrodes in sequence, thus causing a displacement of said distributions along said rows, each receiving electrode (621c, 621d) being connected to one input (622c, 622d) of a differential amplifier (622).

17. Capacitive sensor according to claim 16, wherein the differential amplifier (622) is connected to a comparator (623) for converting the amplified signal into a digital signal, which digital signal is demodulated in a demodulator (624) whose output signal controls a counting direction of an up-down counter (628) whose output signal generates, through a decoder (629) and a modulator (630), said a.c. signal distributions along both rows of transmitting electrodes (621).

18. Capacitive sensor according to claim 14, wherein the scale (310) comprises at least one topographical feature (311) of annular shape, the cursor (320) having at least one set of concentric electrodes comprising at least one annular receiving electrode (321c) lying between transmitting electrodes (321c, 321b) each connected to one of two a.c. signals (Va, Vb).

19. Sensor according to claim 14, wherein the scale (910a) comprises topographical features (911a) periodically arrayed along two perpendicular measuring paths.

20. Sensor according to claim 19, wherein the cursor comprises a two-dimensional array of electrodes connected in rows parallel to the first path and in columns parallel to the second path, said rows of electrodes being connected to a first switching means, said columns of electrodes being connected to a second switching means.

21. Sensor according to claim 19, wherein the cursor (938a, 939b) comprises two electrode arrangements, which arrangement allows a determination of a relative portion between the cursor and the scale along both perpendicular measuring paths.

22. Sensor according to claim 19, wherein the scale consists of a dielectric sheet (911b) having a smooth upper surface closest to the cursor, and a two dimensional array of cavities on the bottom surface of the scale.

* * * * *